United States Patent [19]

Adamo

[11] 3,718,419
[45] Feb. 27, 1973

[54] APPARATUS FOR REMOVING A HOLLOW ARTICLE HAVING INTERNAL ENLARGEMENTS FROM AN INJECTION MOLD ASSEMBLY

[75] Inventor: Michael D. Adamo, East Lyme, Conn.

[73] Assignee: Monsanto Company, St. Louis, Mo.

[22] Filed: April 21, 1971

[21] Appl. No.: 136,062

[52] U.S. Cl. ................................ 425/438, 425/249
[51] Int. Cl. ............................................. B29f 1/14
[58] Field of Search ....... 18/2 RS, 2 RM, 2 RC, 2 RP, 18/30 WC, 30 WM; 264/334, 318; 249/67, 68, 59; 164/216; 425/249, 438, 441, 443

[56] References Cited

UNITED STATES PATENTS

| | | | |
|---|---|---|---|
| 3,057,014 | 10/1962 | Kirch | 18/2 RM X |
| 3,461,488 | 8/1969 | Croyle | 18/2 RP |
| 2,557,918 | 6/1951 | Schmid | 18/2 RS X |
| 1,959,612 | 5/1934 | Burke | 18/2 RS X |
| 3,481,000 | 12/1969 | Barfuss | 18/2 RS X |
| 3,091,810 | 6/1963 | Turner | 18/2 RS X |
| 2,404,631 | 7/1946 | Gronemeyer | 18/2 RS X |

Primary Examiner—J. Spencer Overholser
Assistant Examiner—David S. Safran
Attorney—James C. Logomasini, Michael J. Murphy and Neal E. Willis

[57] ABSTRACT

A method of removing a hollow article having peripherally spaced internal enlargements from an injection mold assembly by first drawing a portion of the mold core intermediate the enlargements rearwardly such that the end of this portion is substantially clear of the enlargements and then rotating the article and the enlargement defining portion of the core with respect to each other to substantially release the article from contact with the enlargement defining core portion. The apparatus includes a special core assembly comprising a shank member having an end portion with peripherally spaced molding depressions in its outer surface for forming the enlargements, a clearance member which is slidable along the shank member to create a clearance for the internal enlargements of either the part or the molding depressions of the shank member when either of the latter is rotated with respect to the other.

4 Claims, 6 Drawing Figures

PATENTED FEB 27 1973

INVENTOR
MICHAEL D. ADAMO
BY
Michael J. Murphy
ATTORNEY

INVENTOR
MICHAEL D. ADAMO
BY
ATTORNEY

3,718,419

APPARATUS FOR REMOVING A HOLLOW ARTICLE HAVING INTERNAL ENLARGEMENTS FROM AN INJECTION MOLD ASSEMBLY

BACKGROUND OF THE INVENTION

This invention relates to injection molding and more particularly to releasing a hollow molded part having internal enlargements from the injection mold assembly.

Many hollow articles formed by injection molding today have internal enlargements which require special techniques and structures for removing them from the mold. Typical of such articles are closures having peripherally spaced lugs or threaded portions on inner sidewall surfaces for engaging the neck of a container. To remove such articles from the mold after forming requires something in addition to mere relative axial movement of the core and cavity surface, since if this were done directly the internal enlargements would be damaged or even broken off. One technique in the past for accomplishing this has involved the use of collapsible cores. Some of such cores are mechanical while others are in the form of resilient bladders. The mechanically collapsible cores often have resiliently deformable segments. These resiliently deformable segments have elastic limits which prevent sufficient movement of the segments to permit molding internal enlargements of any substantial depth, thus limiting the molding to rather shallow internal enlargements. Another technique which has been used, especially when the enlargements are in the form of threads, requires rotating the formed part off of the core pin (or vice versa) for the full length of the thread, but this necessarily and uneconomically extends the length of the molding cycle. Still another approach, especially for molding lugs on the inner surface of a closure, such as disclosed in U.S. Pat. No. 3,482,814, contemplates the insertion of pins through the cavity block, the ends of which shape the innermost surfaces of the lugs, whereupon these pins are removed first after forming thus permitting the core pin and the mold surface to then be separated in a conventional linear manner. Though this technique is effective, the formed part necessarily has a series of holes above the lugs corresponding to the position of the pins during molding and through which the pins were withdrawn after shaping. These otherwise unnecessary holes detract from the aesthetics of the molded part, may affect functionality, and may become reservoirs for contaminants which sometimes requires covering the holes with labels in a secondary operation.

SUMMARY OF THE INVENTION

Now, however, there has been discovered a technique which overcomes the previously mentioned difficulties of the prior art in a simple and efficient manner.

Accordingly, it is a principal object of this invention to provide an improved method and apparatus for removing a hollow article having internal enlargements from an injection molding assembly which are free of the complexities and cost problems of earlier systems.

Another object of this invention is to provide such a method and apparatus which is extremely simple and readily adaptable for use in conventional injection molding machinery with only relatively minor modifications thereof being required.

A further object of this invention is to provide an improved core pin assembly for an injection mold.

Other objects of this invention will in part be obvious and will in part appear hereinafter.

These and other objects are accomplished by providing a method of removing a hollow article having peripherally spaced internal enlargements from an injection molding assembly which comprises drawing a portion of the core of the mold intermediate said enlargements rearwardly such that said portion is substantially clear of said enlargements, rotating the article and an enlargement defining portion of the core with respect to each other to substantially release the article from contact with the enlargement defining core portion, and then ejecting the thus released article from the molding assembly. Preferably the enlargement defining portion is rotated an amount sufficient to bring the molding surfaces thereon into the position previously occupied by the portion of the core intermediate the enlargements, while retaining the article in the position it was in when molded.

The apparatus includes a core assembly for an injection mold comprising a shank portion having peripherally spaced depressions in its outer surface, clearance means slidable on the shank portion, means for moving the clearance means along the shank portion, means for rotating the shank portion and means for holding the shank portion stationary as the clearance means slides thereon. The rotating means for the shank portion preferably comprises a rack and gear assembly.

BRIEF DESCRIPTION OF THE DRAWINGS

In describing the overall invention, reference will be made to the accompanying drawings wherein.

DETAILED DESCRIPTION OF THE PREFERRED EMBODIMENTS

Figure 1:
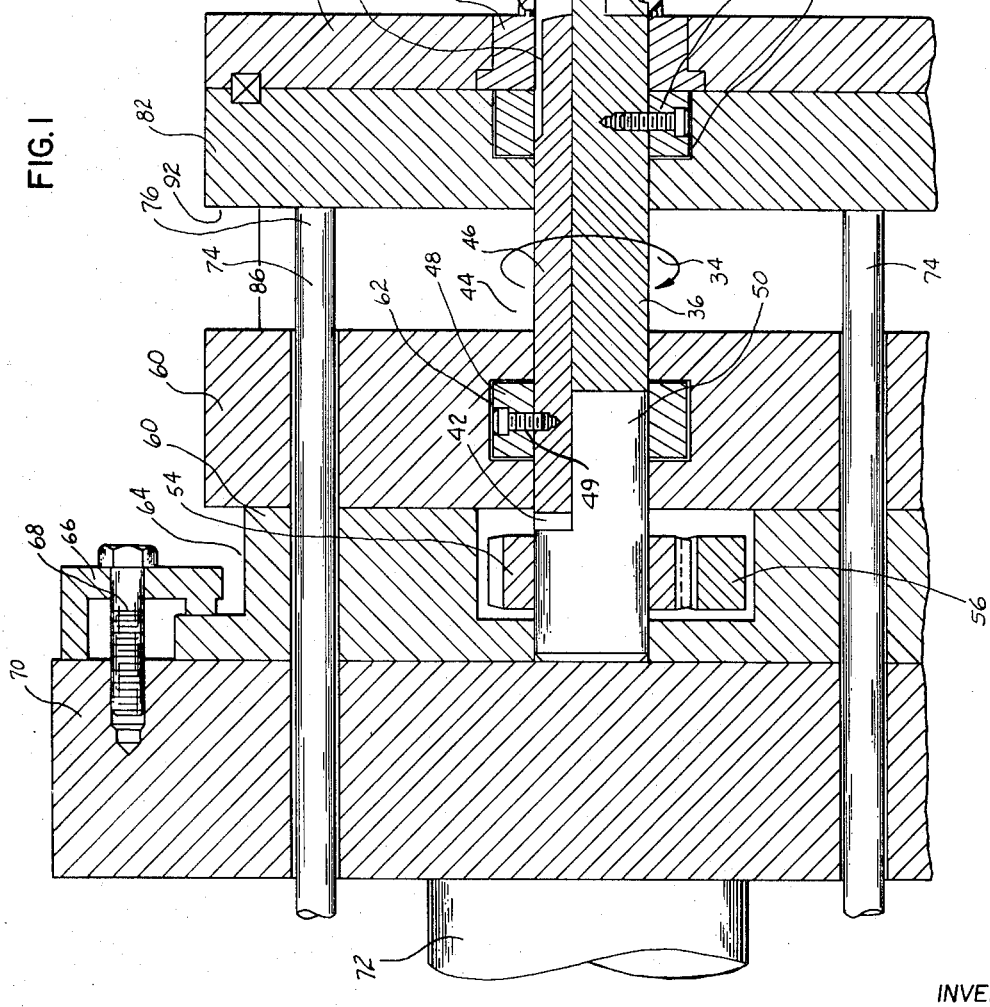
FIG. 1 is a partial, diagrammatical, vertical, sectional view of an injection molding assembly incorporating the improved apparatus of the present invention and depicted in a position wherein the part has been molded and is yet to be removed from the assembly.

Referring now to the drawings, there is illustrated in FIG. 1, an injection molding assembly generally identified as 10. Assembly 10 includes, on the right side of FIG. 1, a cavity block 12 conventionally secured in a cavity plate 14. Block 12 has a cavity formed therein the periphery of which is defined by molding surface 16 such that when assembly 10 is in closed position, as illustrated in phantom in FIG. 1 a cavity is formed conforming exactly to the shape of the article to be injection molded. Thus, molding surface 16 corresponds in contour to the outer surface of the molded part. Cavity block 12 further includes runner feed line 22 which tapers at its forward end to form gate 24 which is positioned on the axis of the molding cavity.

On the left side of FIG. 1, there is illustrated core pin bushing 26 conventionally mounted in a bushing plate 28. Bushing 26 has a series of lugs 30 spaced around the periphery thereof projecting toward the parting line of assembly 10. This parting line is identified as 32 and corresponds to the position of the leading faces of bushing plate 28 and cavity plate 14 when they are in abutting relationship just prior to forming the part. As illustrated in FIG. 1, lugs 30 on core pin bushing 26 extend into the molding cavity and therefore define corresponding depressions in the lower face of the sidewall of the molded part, the function of which will be described hereafter.

The core assembly, generally identified as 34, comprises an elongated shank member 36 having a forward end portion 38 with surface depressions 40 formed therein which are responsible for defining the shape of the internal enlargements of the molded part. Shank 36 also includes a plurality of tracks 42 extending along the length thereof.

Core assembly 34 further includes elongated clearance means 44 which comprises a plurality of segments 46 each of which is slidably positioned within a track 42 in shank member 36. Means comprising an annular collar 48 are provided for holding segments 46 within tracks 42 as the segments slide therein in a manner to be hereafter described. Collar 48 is threadably engaged by suitable conventional fastening members 49 with each segment 46. The leading end portion of each segment 46 has a relatively smooth outer surface 45 and corresponds in length to the leading end portion 38 of shank member 36. These relatively smooth surfaces form a correspondingly smooth surface portion between the enlargements on the inside of the sidewall of the part being formed.

Core assembly 34 further includes, either as a separate part or as an integral extension of shank member 36, a member connecting shank portion 36 with a means for rotating shank portion 36 and clearance member 44. In the embodiment of FIG. 1, such a member is cylindrical extension 50. The means for rotating shank portion 36 and segments 46 of clearance means 44 in this case comprises gear 54 keyed to extension 50 and an associated rack 56 which cooperates in a well known manner with the teeth of gear 54. Thus, when rack 56 is reciprocated in a plane perpendicular to FIG. 1, shank portion 36 and segments 46 held in tracks 42 by means of collar 48 will all rotate in one direction, depending on the direction of movement of the rack.

Actuating plate 60 includes an annular recess for housing gear 54 of the rack and gear assembly as well as a similar recess 62 for containing collar 48. Actuating plate 60 further includes a peripheral indent 64 into which clamp member 66 extends, which in turn is joined in a conventional manner via bolt 68 to a conventional movable platen 70. Movable platen 70 is connected to reciprocatably operable actuating piston 72. Stationary rod(s) 74 extend through actuating plate 60 and movable platen 70, and is connected into a suitable stationary support (not shown) at its left end, the right end 76 thereof being unattached.

The means for moving segments 46 of clearance means 44 axially along tracks 42 of shank member 36 thus includes, in the illustrated embodiment, piston 72 movable platen 70, actuating plate 60 and collar 48 positioned within recess 62 of plate 60.

The means for holding shank portion 36 stationary as segments 46 move along portion 36 includes retaining ring 78 fastened by conventional means to the outer surface of shank member 36, and which is seated, as illustrated, in recess 80 of retaining plate 82 which abuts bushing plate 28. Also included as a part of these holding means is end 76 of each rod member 74 which abuts against retaining plate 82 to prevent rearward movement thereof and consequently of retaining ring 78 and therefore of shank member 36, when the clearance segments 46 slide along tracks 42 in the shank portion 36. Such movement of shank portion 36 to the left of the parting line or to the rear would otherwise occur when segments 46 were activated because of the frictional contact between the surfaces of tracks 42 and segments 46. The position of retaining ring 78 on shank member 36 is adjacent to and rearward of forward end portion 38 thereof and is spaced therefrom by the depth in the axial direction of core pin bushing member 26.

Figure 6:
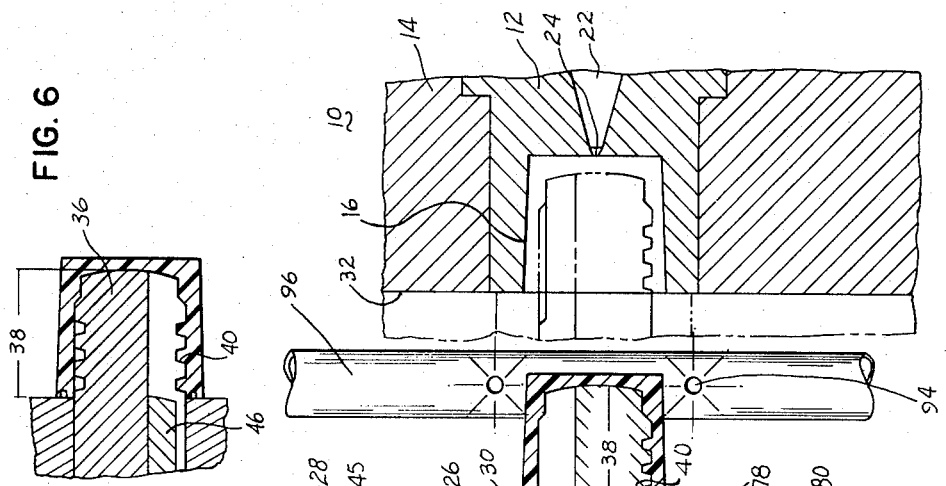
FIG. 6 is a partial, schematic sectional view of one portion of the apparatus of FIG. 1 at one stage in the removal process.
Figure 4:
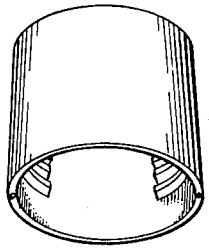
FIG. 4 is a perspective view emphasizing the interior of a closure formed with the apparatus of FIG. 1.

In operation, to commence a molding cycle, piston 72 is actuated in a conventional manner to move the assembly on the left hand side of FIG. 1 toward the right to close the mold along parting line 32. In so doing, movable platen 70 attached to piston 72 moves plate 60 to the right so as to initially eliminate space 86 between actuating plate 60 and retaining plate 82. Further movement forces plate 82, bushing plate 28 and core pin assembly 34 to the right so as to close the mold and to bring the molding surfaces which define the surface contour of the part into opposite alignment. These surfaces are a.) molding surface 16 on one side and b.) the outer surfaces of leading end 38 of shank portion 36 and of clearance member 44 on the other side. A clamping member (not shown) of conventional design is activated to insure that the parts of the assembly on either side of the parting line are held flush together in resistance to the relatively high pressure required to inject the plastic into the molding cavity. Plastic in a suitable condition of plasticity is then injected by a conventional injection means, not shown, through runner 22 and gate 24 into the cavity thereby forming closure 88 which is shaped as illustrated in FIG. 4. In order to now remove closure 88 from the injection molding assembly, it is obvious that if the parts of the assembly were separated in an axial direction thread portions 90 would be sheared off. Therefore, after passage of a short period to allow the plastic to set, piston 72 is actuated in the opposite direction from that which results in mold closing, so as to initially cause the entire series of plates and parts on the left hand side of the parting line to move to the left. However, when surface 92 of retaining plate 82 strikes against end 76 of stationary rod 74, plate 82 will move no further, and in view of the engagement of ring 78 with the surface of recess 80 therein, shank member 36 accordingly likewise will move no further. However, the portion of core assembly 34 defining clearance segments 46 will continue to move to the left because of the engagement of collar 48 in recess 62 of actuating plate 60, collar 48 being rigidly attached to each segment 46. Thus, space 86 is generated between retaining plate 82 and actuating plate 60, whereupon the rearward motion of piston 72 is terminated leaving the parts in the position illustrated in full lines in FIG. 1. This rearward movement of the parts has resulted in drawing the leading end of each segment 46, which is intermediate the enlargement or thread defining portions of shank member 36, rearwardly such that these end portions of the clearance member are substantially clear of the formed enlargements or threads 90 on the molded closure 88, as generally illustrated in FIG. 1. At this point, rack 56 is actuated by a suitable conventional drive means (not shown) so as to rotate the entire core assembly 34 and consequently the enlargement defining leading end portion 38 of shank member 36 an amount sufficient to bring the enlargement or thread defining surfaces into the position previously occupied by the leading ends of the segments 46, while closure 88 is retained in the position it was in when molded because of the engagement of lugs 30 with the lower end of its sidewall 92. After this rotation which is depicted in FIG. 6, closure 88 is seated loosely on the leading end of core assembly 34, since the enlargement defining portions of shank member 36 are out of contact with the threads and are resting against the smooth inner surface of sidewall 92. At this point closure 88 may be ejected from assembly 10 by any of a number of conventional techniques. In the embodiment of FIG. 1, closure 88 is ejected by forcing pressurized air between the released part and the surface of the leading end of core 34, the air, for example, being emitted through a series of vertically spaced orifices 94 formed in a conduit 96 positioned along the parting line of the mold assembly 10.

Figure 2:
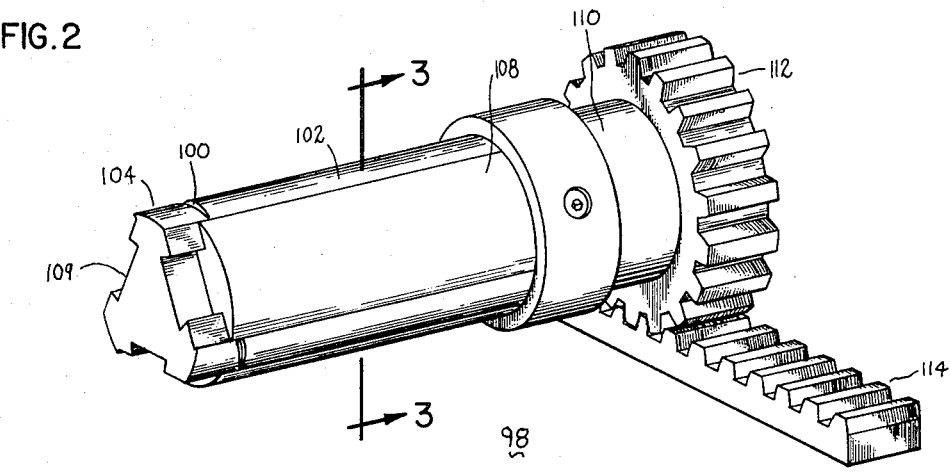
FIG. 2 is a perspective view of an alternative embodiment of the improved core assembly of the present invention.
Figure 5:
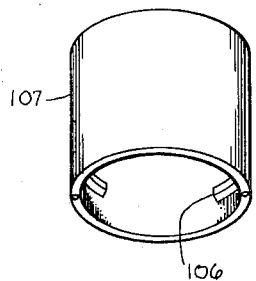
FIG. 5 is a view similar to FIG. 4 of a closure formed utilizing the assembly of FIG. 2.

In the embodiment of the invention illustrated in FIG. 2, the core assembly 98 is constructed similar to and operates the same as assembly 34 illustrated in FIG. 1, except that the enlargement defining portions formed in the outer surface 102 of shank member 104 are in the form of lugs. Assembly 98 when utilized with the remainder of the system illustrated in FIG. 1 will form a closure of the type having a sidewall with peripherally spaced lugs 106 (FIG. 5) on the inner surface thereof. Clearance segments 108 of core pin assembly 98 in this embodiment are three in number and move to the rear an amount substantially equivalent to the length of the sidewall 107 of the closure, though it should be understood that the extent of rearward movement need only be that which is necessary to clear the lug(s) nearest the lower end of the sidewall, should such lugs be staggered vertically along the sidewall in addition to being peripherally spaced thereon. Also, in the embodiment of FIG. 2, the cylindrical extension 110 on which gear 112 is mounted for rotation by rack 114 is formed as an integral part of shank member 104.

Figure 3:
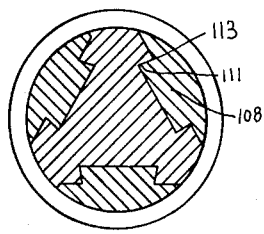
FIG. 3 is a sectional view taken along the line 3—3 of FIG. 2.

As illustrated in FIG. 3, the configuration of tracks 109 in shank member 104 are preferably in the form of a mortice and segments 108 are in the form of keys in cross section, the width 111 of which at its inner end is greater than width 113 at its outer end. It should be realized, however, that alternative configurations of track and clearance segments may be utilized.

The above description and particularly the drawings are set forth for purposes of illustration only and should not be taken in a limiting sense.

Though a rack and gear assembly has been illustrated and is preferred for rotating the improved core pin assembly of the present invention, it should be realized that alternative means will also function satisfactorily. Such means may include mechanical camming devices, fluid operated cylinders, etc.

Though the closure has been illustrated and described as being maintained stationary while the enlargement defining portion of the core assembly is rotated during the removal phase of the process of the present invention, it should be realized that the reverse movement would also accomplish the same result — i.e., rotating the molded part, for example by means of a rack and gear assembly associated with bushing plate 28, while the core pin assembly is held in place.

Also, though an air sparge has been illustrated as the means for ejecting the part off the end of the core pin after the enlargement portions of the part have been released, alternative means will likewise function satisfactorily. Thus, it may be that the part is jarred loose sufficiently by the movement of the core pin assembly that it will fall away under the influence of gravity without any positive means of ejection. Stripping plates, ejector pins, manually operated gripping devices, etc. likewise will perform satisfactorily.

Though the process and apparatus of the present invention has been illustrated and described with respect to a single injection molding assembly, it is obvious that multiples of these may be employed to form a series of parts simultaneously during a single cycle of the system.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A core assembly for an injection mold comprising:
   a. an elongated shank member having a forward end portion with surface depressions formed therein and a plurality of tracks extending along the length thereof;
   b. elongated clearance means comprising a plurality of segments slidably positioned within said tracks and means for holding said sections within the tracks as they slide thereon;
   c. means for moving said segments along the tracks of the shank member;
   d. means for rotating said shank member and said clearance means; and
   e. means including a retaining ring fixedly mounted on the shank member adjacent to and rearward of the forward end portion thereof for holding the shank portion in axially fixed position as the segments of the clearance means slide in the tracks.

2. A core assembly for an injection mold comprising:
   a. a shank portion having peripherally spaced depressions in its outer surface;
   b. clearance means slidable on the shank portion;
   c. means for moving said clearance means along the shank portion;
   d. a rack and gear assembly for rotating the shank portion; and e. means for holding the shank portion stationary as the clearance means slides thereon which includes a retaining plate having a central bore through which the shank portion extends, said plate having an annular recess adjacent said bore, a retaining ring mounted on said shank portion for confinement within said recess and a rod member for abutment against said retaining plate to prevent rearward movement thereof when the moving means moves said clearance means along the shank portion.

3. The assembly of claim 1 including means for holding a molded part stationary during rotation of said shank member and clearance means which includes a series of circumferentially fixed lugs cooperable with said part and projecting toward the parting line of the injection mold assembly.

4. The assembly of claim 1 wherein the means for moving said segments along the tracks includes an annular collar secured at spaced intervals around its periphery to each of said segments, said collar being seated within a recess of a reciprocably mounted actuating plate.

* * * * *